United States Patent
Martinot-Lagarde et al.

(10) Patent No.: US 7,088,413 B2
(45) Date of Patent: Aug. 8, 2006

(54) BISTABLE NEMATIC LIQUID CRYSTAL DISPLAY DEVICE WITH IMPROVED OPTICAL MASK, HAVING TEXTURES DIFFERING BY ABOUT 180° TWIST, AND OFF STATE IN THE LIQUID CRYSTAL COVERING THE INTER-ELECTRODE SPACES

(75) Inventors: Philippe Martinot-Lagarde, Gif sur Yvette (FR); Alain Boissier, Marly le Roi (FR); Jacques Angele, Malakoff (FR); Bertrand Pecout, Guyancourt (FR); Ivan N. Dozov, Gif sur Yvette (FR)

(73) Assignee: Nemoptic, Magny Les (FR)

( * ) Notice: Subject to any disclaimer, the term of this patent is extended or adjusted under 35 U.S.C. 154(b) by 159 days.

(21) Appl. No.: 10/488,223

(22) PCT Filed: Aug. 28, 2002

(86) PCT No.: PCT/FR02/02949

§ 371 (c)(1),
(2), (4) Date: Feb. 26, 2004

(87) PCT Pub. No.: WO03/019278

PCT Pub. Date: Mar. 6, 2003

(65) Prior Publication Data

US 2004/0201817 A1    Oct. 14, 2004

(30) Foreign Application Priority Data

Aug. 29, 2001  (FR)  .................................. 01 11227

(51) Int. Cl.
*G02F 1/1337* (2006.01)

(52) U.S. Cl. ...................... 349/129; 349/110; 349/156; 349/179; 349/180; 349/181

(58) Field of Classification Search ................. 349/129
See application file for complete search history.

(56) References Cited

U.S. PATENT DOCUMENTS

| 4,239,345 A | 12/1980 | Berreman et al. |
| 5,132,816 A | 7/1992 | Itoh et al. |
| 5,488,499 A * | 1/1996 | Tanaka et al. ............... 349/177 |
| 5,764,325 A | 6/1998 | Bryan-Brown et al. |

FOREIGN PATENT DOCUMENTS

| GB | 2350692 | 12/2000 |
| JP | 05005886 | 1/1993 |
| JP | 08327969 | 12/1996 |

* cited by examiner

*Primary Examiner*—Andrew Schechter
(74) *Attorney, Agent, or Firm*—Blakely Sokoloff Taylor & Zafman

(57) ABSTRACT

The invention relates to a bistable nematic liquid-crystal device comprising: alignment means, which orient the liquid crystal, means designed to apply electrical signals which allow switching, by breaking the anchoring on at least one of the two substrates, between two distinct textures, and means designed to promote the establishment of that one of the said textures giving the off state in the liquid crystal covering the inter-electrode spaces.

34 Claims, 2 Drawing Sheets

BISTABLE NEMATIC LIQUID CRYSTAL DISPLAY DEVICE WITH IMPROVED OPTICAL MASK, HAVING TEXTURES DIFFERING BY ABOUT 180° TWIST, AND OFF STATE IN THE LIQUID CRYSTAL COVERING THE INTER-ELECTRODE SPACES

The present invention relates to the field of liquid-crystal displays.

More specifically, the present invention relates to bistable anchoring-breaking nematic liquid-crystal displays, two stable textures of which differ by a 180° twist.

Liquid-crystal displays are widely used for the displaying of symbols, text and images by computers, video projectors, television sets, watches and many other systems for presenting information. Their surface is usually divided into small elements (pixels) which form cells, the states of which are independent.

A very important quality criterion of a liquid-crystal display is optical contrast, this generally being defined by a quantity called the contrast or contrast ratio. The contrast of a liquid-crystal display is the ratio of the intensity of the light transmitted or reflected by a region of the screen placed in the on state to the intensity of the light transmitted or reflected by the same region placed in the off state (whether the intensity of the transmitted light or the reflected light is considered depends on whether the display is designed for operation in transmission or in reflection). The on state of the display is ideally characterized by as high as possible a degree of transmission or reflection, whereas the off state ideally has as low as possible a degree of transmission or reflection. A high contrast gives the information or images displayed a greater readability and better quality. For example, a contrast ratio of less than 10 corresponds to a lacklustre or washed-out image. The same image presented with a contrast of 20 appears much brighter and sharper. The region of the display taken into account for measuring the contrast may incorporate many pixels if the size of the latter is less than the eye's limit of resolution under the normal conditions of observing the display.

Figure 1:
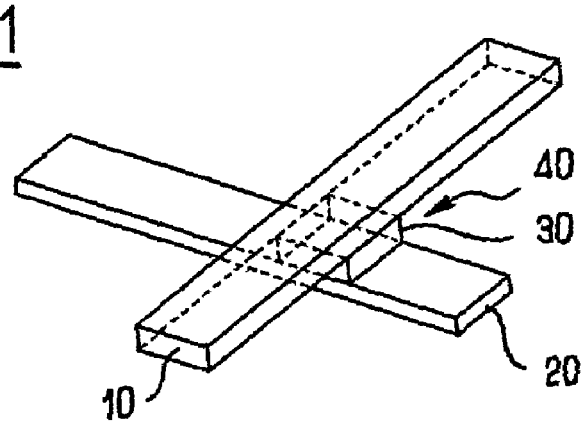
Figure 2:
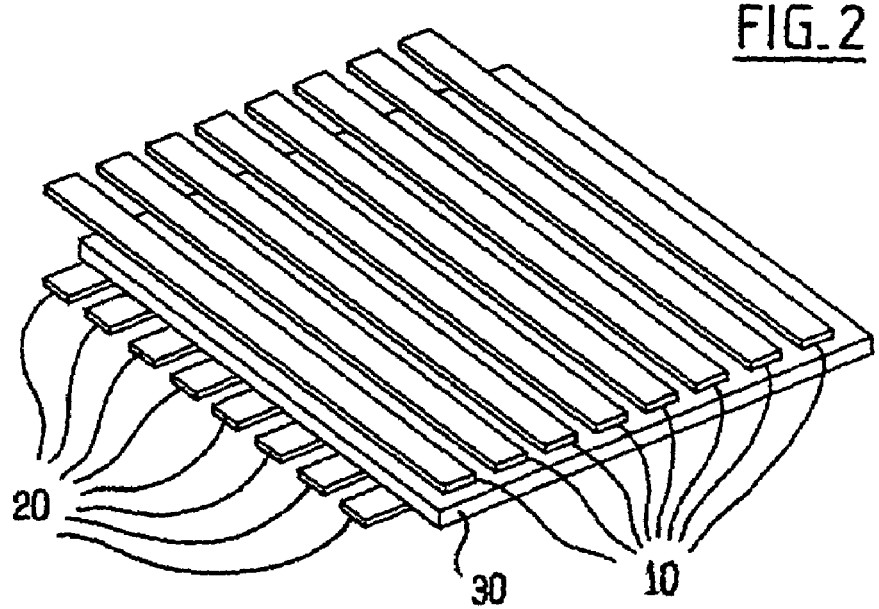
Figure 3:
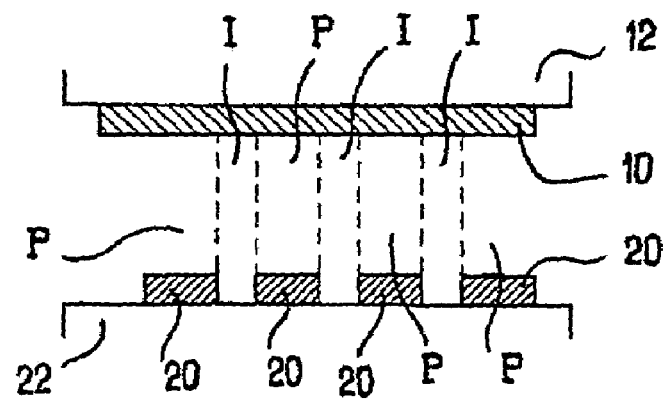

A liquid-crystal display generally comprises, as illustrated schematically in the appended FIGS. 1 to 3, two parallel plates 12, 22 provided with respective electrodes 10, 20 on their inner surfaces and containing a liquid-crystal material 30 between the aforementioned electrodes. The regions of crossover of the opposed electrodes 10, 20 define the pixels 40. The displayed image is formed from the mass of these pixels placed in the desired optical states. The optical state of each pixel, i.e. whether it is on or off, is determined by the application of suitable electric fields between the electrodes 10, 20 which define the pixels and by the addressing circuit used.

Mostly liquid-crystal displays are monostable. In these displays, a single texture is produced with no field. In a field, this texture progressively varies, giving increasingly bright (or increasingly off) states.

Bistable displays possess at least two states which remain stable for a theoretically infinite time in the absence of an applied field. One of the states is the off state and the other the on state. The stability of the two states stems from the fact that the energies of the two textures are practically equal and that there exists a potential barrier preventing one texture from spontaneously switching to the other.

Adjacent pixels are not contiguous but separated by a non-addressable area called the inter-pixel area (see FIG. 3). Shown schematically in FIG. 3 are a pixel with the reference P and an inter-pixel gap with the reference I. When, for example, the display is organized in the form of a passive matrix, the row electrodes 10 are attached to a substrate 12, the column electrodes 20 are attached to another substrate 22 and the electrodes 10 and 20 intersect at right angles. In this case, the pixels P are bounded by the areas in which the row electrodes 10 and column electrodes 20 overlap and the inter-pixel gaps I correspond to the areas facing an inter-electrode space, whether this be on the row substrate 12 or the column substrate 22.

This inter-electrode space allows each electrode to be isolated from its neighbours and it cannot be reduced to below a critical value which depends on the nature and the thickness of the material used to form the electrodes, on the etching technology employed, on the electric fields to be applied and on other characteristics of the display.

In the absence of a blocking layer, the optical state of the inter-pixel gap is poorly defined and the transmission or reflection of the light by these regions is likely to considerably degrade the contrast of a display. For example, a display organized in square pixels of 0.25 mm pitch and having sides of 0.23 mm would have an inter-pixel gap of 0.02 mm in width, corresponding to a total non-active area of about 15% of the total working area of the screen. In the unfavourable situation of an inter-pixel gap always being on, the contrast of the display measured in a region encompassing several pixels could drop to a value of less than 7, even if the microscopic contrast measured within the pixels is arbitrarily high.

The use of a negative-contrast display mode (i.e. a mode having an off state when the field is zero, for example the TN mode in parallel polarizers) makes it possible to limit the loss of contrast compared with a positive-contrast display. However, this solution is not applicable to high-resolution displays for which the lateral fields created when addressing the pixels distort the texture of the liquid crystal between adjacent electrodes and turn it to the optically on state [1]. Choosing a negative contrast may also require the use of an unfavourable optical configuration (the off state of a TN with negative contrast is for example inferior to that of a TN with positive contrast, because of its chromatism), thereby limiting the contrast of the display.

All the other solutions proposed for mitigating the loss of contrast due to the non-active portions of the screen are based on the addition between the pixels or in the inter-electrode space of an opaque layer which blocks the transmitted or reflected light.

Document [2] proposes the use as optical mask of aluminium or chromium layers. The use of metals as optical mask requires an expensive additional vacuum deposition operation and isolation precautions to prevent the appearance of short circuits between pixels. These layers also have an irreducible degree of reflection of about 1.5 to 3%, thereby limiting the contrast in reflection.

Document [3] proposes the use of an absorbent (coloured or black) polymer as optical mask. However, the rather low optical density of coloured polymers requires their use as a relatively thick layer (>0.5 μm) in order to obtain a sufficiently low degree of transmission (<1%). Etching these layers therefore results in the creation of an abrupt internal relief within the display and the concomitant appearance of non-uniform electric fields, which induce orientational defects such as tilt-inversion or twist-inversion regions. These defects may be reduced if the optical mask is enlarged to partially cover the edges of the electrodes, to the detriment of the degree of transmission or reflection in the on state. Moreover, the precision in etching these quite thick polymer layers is poor, which means that the optical mask must be widened in order to maintain sufficient alignment tolerances between the optical mask and the electrodes. This method therefore maintains the contrast, but to the detriment of another important characteristic of the display, which is the brightness of the luminous state.

Another solution is to use a blocking layer made of a stack of a metal and of an absorbent polymer layer providing an antireflection and isolation function [4] so as to optimise the optical properties of the optical mask in transmission and in reflection, without excessively thickening it, or else to make use of even more complicated structures based on dielectrics containing very fine metal or semiconductor particles having absorbent properties [5].

All these methods involve additional manufacturing operations and the use of costly materials or processes. This is because it is necessary to deposit the opaque material on the electrodes and remove it from the active regions. These operations must be precise since it is necessary to create opaque bands 0.01 or 0.02 mm in width without encroaching on the pixels or leaving non-blocked regions. The additional cost incurred is particularly prohibitive in the case of passive matrix displays, the reference price of which is that of STN-LCD monochromatic displays and the manufacturing process of which does not use vacuum deposition.

The present invention makes it possible, in the case of bistable nematic liquid-crystal cells, to block off the inter-pixel spaces without adding material, by modifying or adapting the manufacturing operations. It uses the properties of bistable displays, which properties will be briefly reviewed.

For example, document [6] proposes a bistable display whose states are produced with the same flat or almost flat positions of the molecules on the substrates (monostable anchoring). These states differ by the texture of the liquid crystal between the two surfaces of the substrates. In one of the states, the molecules are practically parallel (the texture is uniform or slightly twisted). In the other state, the molecules rotate flat by a half-turn, going from one substrate to the other (the texture is twisted through 180° with respect to the previous texture). Switching between the two textures is obtained in a strong field by breaking the monostable anchoring on at least one of the surfaces and by using a hydrodynamic effect.

In the present invention, the inter-pixel spaces are blocked off by producing bistable cells such that the liquid crystal in the inter-pixel spaces is permanently in the off state. This is accomplished by setting the anchoring and spontaneous twist conditions specific to the layer of liquid crystal covering the inter-pixel spaces in order therein to favour the texture giving the off state, these conditions reducing its energy compared with that of the texture giving the on state.

In the text below, it will be assumed that the light polarization configuration for observing the display in transmission, in reflection or in a hybrid mode is optimized to the design for giving the best possible off state in the pixels. The off state may correspond either to the twisted texture or to the uniform texture. To take an example, optimization of the polarization configuration in reflection mode is preferably in accordance with the provisions defined in the patent application filed by the Applicant on 12 May 2000 under No. 00/06107.

According to the present invention, the bistable nematic liquid-crystal display device comprises, for forming an inter-pixel optical mask:

a) a nematic liquid-crystal material contained between two parallel substrates, which are provided with electrodes on their facing inner surfaces in order to allow an electric field to be applied to the said liquid crystal, at least the front substrate and the front electrode being optically transparent;

b) alignment layers or treatments on the electrodes which orient the liquid crystal and produce an alternation of at least two distinct textures that are stable or metastable in the absence of a field, where one of the textures is either not twisted or twisted through a total angle of between −90° and +90° and the other texture has an additional twist through an angle of about 180°;

c) the thickness d of the liquid-crystal layer covering the electrodes being chosen so that the product $d.\Delta n$ is close either to $\lambda_{0/4}$ or $\lambda_{0/2}$, to within an integer multiple of the wavelength, or else is between these two values (depending on whether the operating mode of the display is reflective, transmittive or transflective), $\lambda_0$ being the median wavelength of the useful spectral band of the display and $\Delta_n$ the birefringence of the liquid crystal for this wavelength;

d) means designed to apply, to the liquid crystal covering the electrodes, electrical signals which allow it to switch, by breaking the anchoring on at least one of the two substrates, between the said distinct textures and allow it to remain in one of them after the field has been removed; and e) means designed to promote the establishment of that one of the said textures giving the off state in the liquid crystal covering the inter-electrode spaces.

It should be understood that the number and the arrangement of the polarizers are optimized according to the optical operating mode (transmissive, reflective or transflective) of the display device.

According to other advantageous features of the present invention:

at least one of the electrodes contains several different segments in order to make it possible to produce several independent picture elements (pixels) on the same substrate and in the same device;

the independent picture elements (pixels) are provided with independent means for applying the field;

the independent picture elements (pixels) are organized in a multiplexed passive matrix; or the independent picture elements (pixels) are organized in a multiplexed active matrix.

Figure 4:
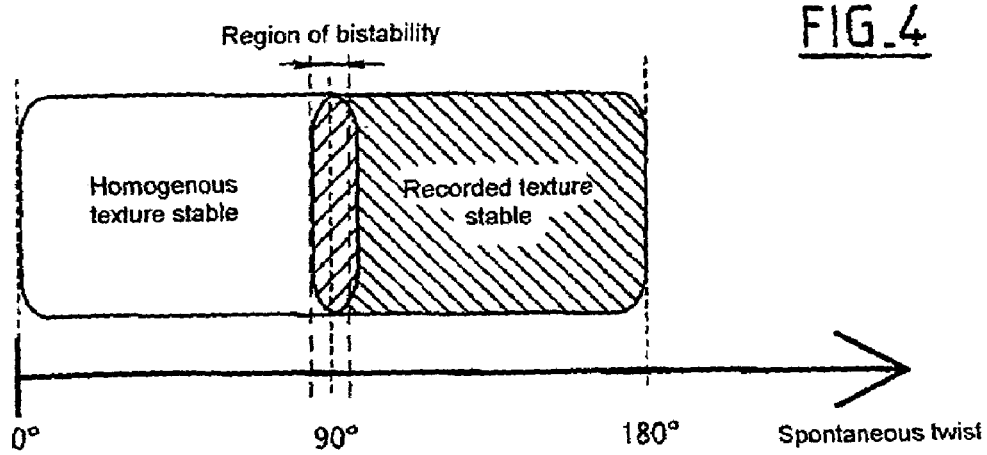
Figure 5:
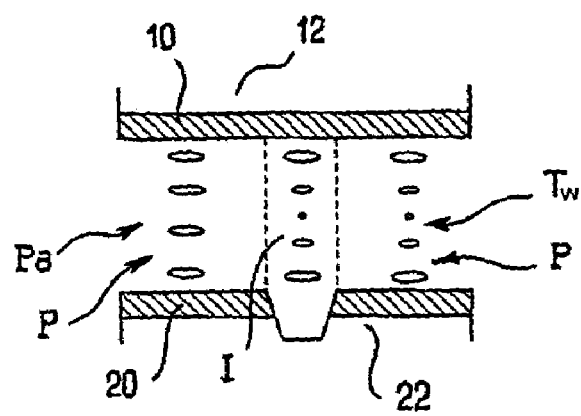
Figure 6:
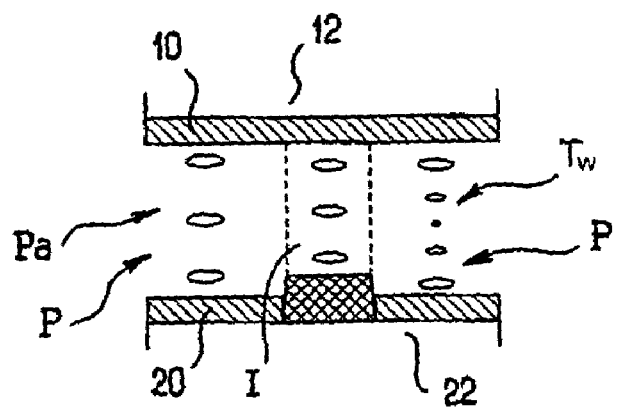

Further features, objects and advantages of the present invention will become apparent on reading the detailed description which follows and in conjunction with the appended drawings, given as non-limiting examples and in which:

FIG. 1, described above, shows schematically a conventional pixel obtained at the intersection of two mutually orthogonal electrodes;

FIG. 2, described above, shows schematically a multiplexed matrix formed by an assembly of two crossed arrays of electrodes, the electrodes being located on each side of a liquid-crystal material, defining pixels and inter-electrode spaces;

FIG. 3, also described above, shows schematically a sectional view of such a multiplexed matrix;

FIG. 4 illustrates schematically the stability of the textures as a function of the spontaneous twist in the thickness of the liquid crystal;

FIG. 5 shows schematically the induction of a twisted texture in an inter-pixel gap in accordance with the present invention, by the removal of material, leading to stable parallel ($P_A$) or twisted ($T_W$) textures (and therefore to an instability) in the pixels and to a preferential twisted texture in the inter-pixel gap; and FIG. 6 shows schematically the induction of a parallel texture in an inter-pixel gap in accordance with the present invention, by adding material, leading to stable parallel ($P_A$) or twisted ($T_W$) textures (and therefore to an instability) in the pixels and to a preferential parallel texture in the inter-pixel gap.

The displays forming the subject of the present invention can address two stable textures on the liquid-crystal layer covering their pixels. Bistability is achieved by adding a chiral dopant to the liquid crystal.

Without a chiral dopant, a liquid crystal has a uniform orientation in the absence of torque. Its free pitch is infinite. In the presence of a chiral dopant, the orientation of the liquid crystal rotates along its helix when it is traversed along its axis. The liquid crystal then has a finite free pitch (the orientation direction rotates through 360° after a displacement along the axis of a distance equal to the pitch). The free pitch decreases as the dopant concentration increases. The free twist $q_0$ of the liquid crystal is defined by the expression $2\pi/p_0$ where $p_0$ is the free pitch of the liquid crystal, and the spontaneous twist after the traversing of a specimen of the liquid crystal having a thickness d is defined by $d \cdot q_0$. The spontaneous twist is therefore the angle through which the director would have rotated after traversing the layer of liquid crystal in the absence of any torque.

Bistability is obtained by adjusting the spontaneous twist in the thickness of the liquid crystal covering the pixels to a value of 90°. The conditions of anchoring on the surfaces, in the two possible—twisted and uniform—textures dictate that the liquid crystal is deformed by a twist of about 90° with respect to its equilibrium state. The energies of the two states are then equal and the two textures become bistable. A spontaneous twist of less than 90° favours the uniform texture while a spontaneous twist of more than 90° favours, on the other hand, the twisted texture. We should note at this stage that the fine features of the anchoring on the surfaces also contribute to the energy of the textures. For example for the same 90° spontaneous twist of the liquid crystal in the thickness of the cell, an anchoring configuration with a sufficiently high parallel pretilt will favour the twisted texture, whereas a configuration with the same but antiparallel pretilt will favour the uniform texture. In practice, strict balancing of the energies is not absolutely essential for ensuring bistability, because of the existence of a potential barrier preventing the spontaneous transition from one texture to the other. For example, the spontaneous twist may be adjusted over a certain range centred on 90° without loss of bistability (the twisted and uniform textures both remaining stable). However, outside this range, the texture of minimum energy is the only one which is stable (see FIG. 4).

The means developed by the present invention for establishing the texture giving the off state in the liquid crystal covering the inter-pixel gap will now be presented.

The first means is to make the thicknesses of the liquid crystal in the active portions (pixels) and the non-active portions (inter-pixel gaps) different, this thickness difference being adjusted by selective removal or addition of material. Since the spontaneous twist in the pixels must be close to 90°, in order to make the twisted and uniform textures therein of equal energy, the localized addition or removal of material in the inter-electrode spaces of each substrate decreases or increases the spontaneous twist in the thickness of the liquid crystal in the inter-pixel gaps. The difference in twist is proportional to the difference in the thicknesses of the liquid crystal covering the pixels and the inter-pixel gaps. When the twist in one place differs significantly from the 90° ideal equilibrium twist, the bistability is lost and one of the two textures is favoured (a difference of around 5 to 10\20 is sufficient for example to favour one texture). According to this first means, all that therefore is required is to set by manufacture the said thickness difference to a value sufficient to make the texture giving the on state unstable (it being possible for this texture to be either the uniform texture or the twisted texture, depending on the polarization configuration adopted).

If it is the twisted texture which gives the off state, a slight recessing of the inter-electrode space on at least one substrate favours it and establishes it in the inter-pixel gap, thus forming a liquid-crystal optical mask (see FIG. 5).

If it is the uniform texture which gives the off state, localized deposition of material in the inter-electrode space, on at least one substrate, allows the same result to be achieved (see FIG. 6).

For example, let us take the case of a display in reflection, provided with a circular polarizer on the front face and a reflector on the rear face, the display being filled with a liquid crystal having a birefringence $\Delta n \approx 0.13$. The thickness d of liquid crystal covering the pixels is chosen to be 1.1 µm, similar to the optimum thickness for the reflective case given by the equation $d \cdot \Delta n = \lambda_0/4$ where $\lambda_0$ is the median wavelength of the spectral operating region. The twisted texture therefore gives the off state. The spontaneous equilibrium twist giving bistability to the pixels is adjusted by manufacture to 90°. By recessing the inter-electrode spaces by 0.1 µm on each substrate, the spontaneous twist becomes approximately 98° in the thickness of the liquid crystal covering the inter-pixel gaps (equal to 1.2 µm—here we neglect the case of the small regions where the inter-electrode spaces of the two substrates intersect). This twist is sufficient to favour the twisted texture being established. An off state optical mask having a low degree of reflection surrounding the pixels is therefore formed.

The thickness of the liquid crystal in the inter-pixel gap must, however, remain sufficiently close to that in the pixels so that the optical state of the inter-pixel gap remains the off state. This condition is satisfied when the difference in thickness of the liquid crystal covering the pixels and the inter-pixel gaps does not exceed approximately 15% of the thickness of the liquid crystal covering the pixels. This condition determines the maximum amplitude of the internal relief of the display, more specifically that of the alignment surface deposited on the electrodes or inter-electrode spaces, it being possible for this relief to be in the form of recesses or projections. The choice of recessed or added material in the inter-electrode space and the choice of etching or deposition method are guided by considerations of compatibility with the usual manufacturing process for displays. For example, if a plasma etching means is used to manufacture the electrodes, the slight recessing of the inter-electrode space requires neither an additional mask nor a new operation (however, it may prove necessary to adapt the etching parameters).

Another means developed by the present invention for forming the liquid-crystal optical mask applies to the case in which the off state is given by the twisted texture. This means consists in manufacturing electrodes of thickness adapted to the creation of the relief allowing the twisted texture to be established in the inter-pixel gap. However, this method requires relatively thick electrodes (for example with a thickness of about 40 nm or more) to be manufactured. This is sometimes incompatible with compliance with the optical or electrical specifications of the display or with certain manufacturing constraints.

Another method for inducing the liquid-crystal optical mask is to adjust the chiral dopant content of the liquid crystal until the appearance of the desired texture is obtained in the inter-pixel gap, the display being designed so that the thickness of the liquid crystal covering the pixels and the inter-pixel gaps is slightly different. The potential barrier which exists between the twisted and uniform textures gives in fact a certain spread to the range of spontaneous twists compatible with bistability in the pixels. For example, the chiral dopant content may be increased up to the point of reaching the limit of bistability in the pixels without exceeding it. Any recessed relief, even barely pronounced, in the inter-pixel gap compared with the pixel makes the spontaneous twist exceed this limit, it thereby being sufficient to selectively establish therein the twisted texture. The same method applies to establishing the uniform texture in an inter-pixel gap having a projecting relief, by reducing the chiral dopant content down to the limit value.

Another method is to create anchoring conditions specific to the liquid-crystal layer covering the inter-pixel spaces which favour the texture giving the off state. For example, the alignment layer may be deposited in the liquid phase in such a way that it has an additional thickness in the recessed inter-electrode spaces compared with its thickness on the surface of the electrodes, thereby reducing its azimuthal anchoring energy. This effect, in conjunction with the local lowering of the brushing force applied in these recessed surfaces, favours the twisted texture being established by the orientation direction slipping under the influence of the azimuthal torque exerted by the liquid-crystal layer. This result may be accentuated by a heat treatment of the display. It is also possible, by carrying out an orientation treatment in two goes, to selectively modify the orientation direction in the inter-electrode space so that the spontaneous twist in the liquid-crystal layer covering these spaces is unfavourable to the twisted or uniform texture therein. In the same way, selective modification of the pretilt may allow the same result to be achieved.

Finally, the use of temporary treatment may allow the texture giving the off state to be established in the inter-pixel gap, even when the internal relief is slight, by momentarily favouring the desired texture. For example, if the display is filled with a provisional thickness of liquid crystal slightly greater than the final thickness, the spontaneous twist temporarily favours the twisted state being established both in the pixels and the inter-pixel gaps. When the layer of liquid crystal is reduced to its nominal thickness at the end of the manufacturing operations, bistability in the pixels is obtained. If the recessed relief in the inter-pixel gaps is sufficient, it has been observed that the uniform texture is unstable and the twisted texture is favoured. If the relief is too slight (for example when it is caused by the etching of thick electrodes by less than 40 nm), the inter-pixel gaps are also bistable and preserve the twisted state initially established by the temporary treatment. This state is no longer affected by the subsequent operation of display and a definitive optical mask is obtained.

Another means is to carry out a heat treatment of the display after filling, often allowing the same result to be obtained.

When one of the methods explained above is employed, the liquid crystal itself blocks off the non-addressable regions of the display and forms a liquid-crystal optical mask easily achieving a contrast value of greater than several tens.

The favourable properties of this self-aligned liquid-crystal optical mask are obtained whether the operation is transmissive, reflective or transflective and they have many advantages compared with the other blocking techniques already discussed in which opaque layers are deposited and etched:

low intrinsic degrees of transmission and reflection of the liquid-crystal optical mask, these being adapted to the production of high-contrast transmissive, reflective or transflective displays;

no degradation in the off state by partial blocking of the pixels by an added optical mask (maximum open aperture ratio);

no degradation in the homogeneity of the electric field within the display;

no disturbance of the alignment of the liquid crystal outside the image refreshing periods and therefore no degradation in the contrast when the stored image is observed; and no operation of depositing or of aligning the liquid-crystal optical mask.

Although the above methods have been presented taking the example of displays in the form of passive matrices, they can be applied to any particular arrangement of electrodes of the two substrates resulting in the definition of addressable regions (pixels) or non-addressable regions (inter-pixel gaps).

BIBLIOGRAPHY

[1] A. Lien, "Two dimensional Simulation of the Lateral Field Effect of a 90 degree TN-LCD cell", IDRC Eurodisplay '90 Digest.

[2] European Patent EP 0 532 311 (Scheffer) published on 17 Mar. 1993.

[3] U.S. Pat. No. 5,307,189 (Nishiki) published on 26 Apr. 1994.

[4] U.S. Pat. No. 5,666,177 (Hsieh Ting-Chang) published on Sep. 9, 1997.

[5] U.S. Pat. No. 5,686,980 (Kobayashi) published on Nov. 11, 1997.

[6] French Patent No. 2 740 894 (Durand).

The invention claimed is:

1. Bistable nematic liquid-crystal display device with a liquid-crystal optical mask, characterized in that it comprises:
   a) a nematic liquid-crystal material contained between two parallel substrates, which are provided with electrodes on their facing inner surfaces in order to allow an electric field to be applied to the said liquid crystal, at least the front substrate and the front electrode being optically transparent;
   b) alignment layers or treatments on the electrodes which orient the liquid crystal and produce an alternation of at least two distinct textures that are stable or metastable in the absence of a field, where one of the textures is either not twisted or twisted through a total angle of between −90° and +90° and the other texture has an additional twist through an angle of about 180°;
   c) the thickness d of the liquid-crystal layer covering the electrodes being chosen so that the product $d.\Delta n$ is close either to $\lambda/4$ or $\lambda/2$, to within an integer multiple of the wavelength, or else is between these two values, $\lambda_0$ being the median wavelength of the useful spectral band of the display and $\Delta n$, the birefringence of the liquid crystal for this wavelength;

d) means designed to apply, to the liquid crystal covering the electrodes, electrical signals which allow it to switch, by breaking the anchoring on at least one of the two substrates, between the said distinct textures and allow it to remain in one of them after the field has been removed; and e) means designed to promote the establishment of that one of the said textures giving the off state in the liquid crystal covering the inter-electrode spaces.

2. Device according to claim 1, characterized in that it furthermore includes a chiral dopant whose content is adjusted in such a way that the spontaneous twist in the thickness of the liquid crystal covering the inter-electrode spaces is unfavourable to the texture giving the on state and in that the spontaneous twist in the thickness of the liquid crystal covering the pixels lies within the range allowing both these textures to be bistable.

3. Device according to either of claims 1 and 2, characterized in that it has a difference in thickness of liquid crystal between the active portions corresponding to the pixels and the non-active portions corresponding to the inter-pixel gaps.

4. Device according to claim 3, characterized in that the difference in thickness of the liquid crystal is produced by localized addition or removal of material in the inter-electrode spaces of each substrate in such a way that the spontaneous twist in the thickness of the liquid crystal covering the inter-electrode spaces is unfavourable to the texture giving the on state.

5. Device according to claim 1, characterized in that it includes electrodes with a thickness such that the spontaneous twist in the thickness of the liquid crystal covering the inter-electrode spaces is unfavourable to the texture giving the on state.

6. Device according to claim 1, characterized in that the means for favouring establishment of the texture giving the off state comprise an alignment or anchoring characteristics, in the inter-electrode spaces, adjusted so as to favour the texture giving the off state therein.

7. Device according to claim 1, characterized in that the means to favour the texture giving the off state comprise a temporary treatment of the electrical, mechanical or heat type, associated with anchoring characteristics such that the temporary treatment is unfavourable to the texture giving the on state in the inter-electrode spaces.

8. Device according to claim 1, characterized in that at least one of the electrodes contains several different segments in order to make it possible to produce several independent picture elements (pixels) on the same substrate and in the same device.

9. Device according to claim 1, characterized in that independent picture elements (pixels) are provided with independent means for applying the field.

10. Device according to claim 1, characterized in that independent picture elements (pixels) are organized in a multiplexed passive matrix.

11. Device according to claim 1, characterized in that independent picture elements (pixels) are organized in a multiplexed active matrix.

12. Process for manufacturing a bistable nematic liquid-crystal display device with a liquid-crystal optical mask, characterized in that it comprises the steps consisting in:

a) placing a nematic liquid-crystal material between two parallel substrates, which are provided with electrodes on their facing inner surfaces in order to allow an electric field to be applied to the said liquid crystal, at least the front substrate and the front electrode being optically transparent;

b) forming alignment layers or treatments on the electrodes which orient the liquid crystal and produce an alternation of at least two distinct textures that are stable or metastable in the absence of a field, where one of the textures is either not twisted or twisted through a total angle of between −90° and +90° and the other texture has an additional twist through an angle of about 180°;

c) controlling the thickness d of the liquid-crystal layer covering the electrodes so that the product $d.\Delta n$ is close either to $\lambda/4$ or $\lambda/2$, or else is between these two values, $\lambda_0$ being the median wavelength of the useful spectral band of the display and $\Delta n$ the birefringence of the liquid crystal for this wavelength;

d) providing means designed to apply, to the liquid crystal covering the electrodes, electrical signals which allow it to switch, by breaking the anchoring on at least one of the two substrates, between the said distinct textures and allow it to remain in one of them after the field has been removed; and e) providing means designed to promote the establishment of that one of the said textures giving the off state in the liquid crystal covering the inter-electrode spaces.

13. Process according to claim 12, characterized in that it comprises the step consisting in producing a different thickness of liquid crystal between the active portions corresponding to the pixels and the inter-pixel non-active portions.

14. Process according to claim 13, characterized in that the difference in thickness between the active and non-active portions is less than 15% of the thickness of the liquid crystal covering the active portions.

15. Process according to either of claims 13 and 14, characterized in that the difference in thickness of the liquid crystal is between 5 and 10% of the thickness of the liquid crystal covering the active portions.

16. Process according to claim 13, characterized in that the difference in thickness of the liquid crystal is produced by removing material between the active portions.

17. Process according to claim 16, characterized in that the removal of material is controlled in order to define a twisted texture corresponding to the off state.

18. Process according to claim 16, characterized in that the localized removal of material in the inter-electrode spaces of each substrate is carried out during the same operation as the etching of the electrodes, by a wet etching or plasma-enhanced etching process.

19. Process according to claim 13, characterized in that the difference in thickness of the liquid crystal is obtained by adding material in the non-active portions.

20. Process according to claim 19, characterized in that the addition of material is controlled so as to obtain a uniform texture corresponding to the off state in the inter-electrode spaces.

21. Process according to claim 13, characterized in that the difference in thickness of liquid crystal is obtained by controlling the thickness of the electrodes in such a way that the spontaneous twist in the thickness of the liquid crystal covering the inter-electrode spaces is unfavourable to the texture giving the on state.

22. Process according to claim 12, characterized in that it includes a step consisting in adjusting the chiral dopant content of the liquid crystal in such a way that the spontaneous twist in the thickness of the liquid crystal covering the inter-electrode spaces is unfavourable to the texture giving the on state and in that the spontaneous twist in the thickness of the liquid crystal covering the pixels lies within the range allowing the twisted and uniform textures to be bistable.

23. Process according to claim 22, characterized in that the device has a recessed inter-pixel relief and in that the step of adjusting the chiral dopant content consists in increasing this content until a bistability limit is obtained.

24. Process according to claim 22, characterized in that the device includes projecting inter-pixel reliefs and in that the step of adjusting the chiral dopant content consists in reducing this content until a bistability limit is obtained.

25. Process according to claim 24, characterized in that it includes a step consisting in depositing an alignment layer in the liquid phase in such a way that it has an additional thickness in the recessed inter-electrode spaces compared with its thickness on the surface of the electrodes, so as to reduce its azimuthal anchoring energy.

26. Process according to claim 12, characterized in that it includes the step consisting in controlling the anchoring or alignment characteristics in the inter-electrode spaces so as to favour the textures giving the off state therein.

27. Process according to claim 26, characterized in that it includes an orientation treatment carried out in two goes so as to selectively modify the orientation direction in the inter-electrode space so that the spontaneous twist in the liquid crystal layer covering these spaces is unfavourable to the on state texture therein.

28. Process according to claim 12, characterized in that it includes an electrical, mechanical or heat treatment of the device so as to induce a temporary modification of the spontaneous twist and to control the anchoring characteristics in the liquid crystal covering the inter-electrode spaces, such that this temporary treatment is unfavourable to the texture giving the on state therein.

29. Process according to claim 12, characterized in that the filling operation is carried out with a thickness of liquid crystal unfavourable to the texture giving the on state, the end-of-manufacturing operations then giving the layer of liquid crystal filling the device its nominal thickness.

30. Process according to claim 29, characterized in that the operation of filling the device is carried out with a thickness of liquid crystal greater than the final nominal thickness, the layer of liquid crystal then being reduced to its nominal thickness, at the end of the manufacturing operations, in order to obtain bistability in the pixels while maintaining the texture unfavourable to the on state between the pixels.

31. Process according to claim 12, characterized in that at least one of the electrodes contains several different segments in order to make it possible to produce several independent picture elements (pixels) on the same substrates and in the same device.

32. Process according to claim 12, characterized in that the independent picture elements (pixels) are provided with independent means for applying the field.

33. Process according to claim 12, characterized in that the independent picture elements (pixels) are organized in a multiplexed passive matrix.

34. Process according to claim 12, characterized in that the independent picture elements (pixels) are organized in a multiplexed active matrix.

* * * * *